United States Patent
Gong et al.

(10) Patent No.: US 11,215,331 B2
(45) Date of Patent: Jan. 4, 2022

(54) PANEL LIGHT APPARATUS

(71) Applicant: XIAMEN ECO LIGHTING CO. LTD., Xiamen (CN)

(72) Inventors: Guangquan Gong, Xiamen (CN); Jiansheng Zhang, Xiamen (CN); Guanyinlian Liu, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 50 days.

(21) Appl. No.: 16/051,364

(22) Filed: Jul. 31, 2018

(65) Prior Publication Data

US 2020/0041080 A1 Feb. 6, 2020

(51) Int. Cl.

| F21S 4/28 | (2016.01) |
| F21V 29/70 | (2015.01) |
| H05B 45/20 | (2020.01) |
| F21V 8/00 | (2006.01) |

(52) U.S. Cl.
CPC ............ *F21S 4/28* (2016.01); *F21V 29/70* (2015.01); *G02B 6/0051* (2013.01); *H05B 45/20* (2020.01)

(58) Field of Classification Search
CPC ........ F21S 4/28; G02B 6/0068; G02B 6/0085
See application file for complete search history.

(56) References Cited

U.S. PATENT DOCUMENTS

| 5,375,043 A * | 12/1994 | Tokunaga ........... F21V 23/0407 362/601 |
| 10,132,477 B1 * | 11/2018 | Winters ................ F21V 17/166 |
| 2010/0053956 A1 * | 3/2010 | Park ......................... F21K 9/00 362/235 |
| 2011/0037717 A1 * | 2/2011 | Yeh .................... G02F 1/133608 345/173 |
| 2012/0236597 A1 * | 9/2012 | Liao ........................ F21S 2/005 362/612 |
| 2013/0063979 A1 * | 3/2013 | Chen ........................ F21V 29/00 362/609 |
| 2015/0009713 A1 * | 1/2015 | Yang .................... G02B 6/0085 362/612 |
| 2018/0031900 A1 * | 2/2018 | You ...................... G02B 6/0085 |

* cited by examiner

*Primary Examiner* — Matthew J. Peerce
(74) *Attorney, Agent, or Firm* — Chun-Ming Shih; Lanway IPR Services

(57) ABSTRACT

A panel light apparatus includes a heat sink frame, a first LED light bar, an optical guiding module and a back cover. The first LED light bar has a first plugging structure to be plugged to a second plugging structure of the heat sink frame. Heat of the LED light bar is transmitted to the heat sink frame. The optical guiding module includes a light diffusion layer and a light guiding layer. A lateral side of the light guiding layer faces to LED modules of the first LED light bar for guiding light of the LED modules to the diffusion layer. The light guiding layer and the light diffusion layer are fixed together as an assembly module before being placed in the surrounding border.

10 Claims, 7 Drawing Sheets

PANEL LIGHT APPARATUS

FIELD OF INVENTION

The present invention is related to a panel light apparatus and more particularly related to a panel light apparatus with modular components.

BACKGROUND

There are various lighting devices designed for satisfying different needs. For example, there are light bulbs to be installed on sockets. Such light bulbs are usually easy to be installed by users. For downlight devices used in normal home, it would be important to consider convenience for installation, safety and replacement.

In addition to consider the user aspect, it is found that manufacturers and sales channels are also important places to provide innovative designs. After all, the total cost of a light device, which affects whether the product may be widely broadcasted, is not only manufacturing and component cost. For example, storage cost in sales channel is also an important factor.

Therefore, it would be beneficial to provide designs that are easily to be installed, assembled, and thus even help decrease total cost. On the other hand, it would be even better if further advantages may be introduced in the same products.

SUMMARY OF INVENTION

According to an embodiment, a panel light apparatus includes a heat sink frame, a first LED light bar, an optical guiding module and a back cover. The panel light apparatus may be installed below a ceiling, attach to a wall or installed in other applications. The heat sink frame defines light output shape, e.g. a rectangular light output shape. The thickness of the panel light apparatus is usually smaller than width of the light output shape. Usually, the thickness of the panel light apparatus is smaller than normal downlight devices so that the panel light apparatus does not need an additional installation cavity, e.g. in a ceiling.

The heat sink frame includes a plurality of frame bars forming a surrounding border. For example, if the heat sink frame has a rectangular shape, there are four frame bars at four sides. The four frame bars form a rectangular surrounding border. Please be noted that the frame bar may also be made of one or multiple frame bars to form different shapes, e.g. circular, ellipse, two connected rectangular shapes like a digit '8' or other shapes.

The first LED light bar has a first plugging structure to be plugged to a second plugging structure on an inner side of one of the frame bars. For example, if the panel light apparatus is a rectangular shape panel light, there are four frame bars as mentioned above. One frame bar is disposed with a second plugging structure associating with a first plugging structure of a LED light bar. The first plugging structure may be a male pin when the second plugging structure may be a female socket, and vice versa. The first plugging structure and the second plugging structure may provide both structural connection and electricity connection. In other words, the first LED bar may receive electricity from the connection of the first plugging structure and the second plugging structure. Meanwhile, the first LED bar is fixed to the heat sink frame by the connection of the first plugging structure and the second plugging structure. Please be noted that the plugging structure may have various shapes, e.g. elastic clips, hooks and associates connecting structures.

Besides, the first LED light bar is a major heat source, and heat generated from the first LED light bar is transmitted to the frame bars of the heat sink frame.

The optical guiding module is placed in the surrounding border. For example, the surrounding border is a rectangular shape and the optical guiding module is also a similar rectangular shape but with a smaller size. The optical guiding module is placed in the enclosing border of the heat sink frame.

The optical guiding module may have a light diffusion layer and a light guiding layer. The light guiding layer may be a transparent plastic board a plurality of micro structures for guiding light received from a lateral side of the transparent plastic board to route in the light guiding layer and then escapes the light guiding layer from a plurality of micro optical structures, e.g. micro cavities, that may be formed on the transparent plastic board using laser beams or molding technologies.

The light guiding layer has a lateral side facing to LED modules of the first LED light bar for guiding light of the LED modules to the diffusion layer via the light guiding layer and then to escape from a front side of the optical guiding module.

The light diffusion layer is used for diffusing light so that the light would not look too hash for human eyes, e.g. to soften the output light and to avoid users see a series of strong light points.

In addition, the light guiding layer and the light diffusion layer are fixed together as an assembly module before being placed in the surrounding border. With such design, it is easy to assembly the final product by placing all components together. For example, when the light guiding layer and the light diffusion layer are fixed together as an assembly module, a manufacturer, even a distributor or a customer, may easily place these components together, instead of needing to positioning, aligning these components.

The back cover is fixed to the heat sink frame pressing a back side of the optical guiding module. The term 'pressing' refers to directly or indirectly providing a force on the back side of the optical guiding module. The back side is opposite to a front side where light is output.

In some embodiments, the frame bars are mainly elongated metal bars. Some additional components like plastic, rubber components may also be added.

In some embodiments, the external surface of the heat sink frame has horizontal ripple structures. Such horizontal ripple structures increase rigidity of the panel light apparatus. Such horizontal ripple structures also enhance heat dissipation effect.

Specifically, the horizontal ripple structures may be composed of a series of concave and convex structures on the external surface of frame bars. In the example of a rectangular panel light apparatus, there are four frame bars defining a surrounding border that has a front side for light to emit and a back side to connect to a driver. In such example, the external surfaces are the four lateral surfaces of the four frame bars facing outwardly and substantially perpendicular to the front side and the back side. The term horizontal in the horizontal ripple structures refers that convex and concave structures are substantially perpendicular to the front side and the back side.

There is another type of example. The external surface of the frame bars is disposed with vertical ripple structures. In such embodiments, the convex and concave structures on the surfaces of the frame bars are parallel to the front side and the back side.

In some embodiments, the optical guiding module has a clip at a corner for fixing the light guiding layer to the light diffusion layer. The clips may be made of a plastic element or any other elastic component for pressing the light guiding layer and the light diffusion layer as an assembly module. The clip may also be a tape using glues to attach on surface of the light guiding layer and the light diffusion layer. In addition to the corner, there may be more than one clips for ensuring the light guiding layer fixed to the light diffusion layer as an assembly module. In other words, manufacturers or users may take one such assembly module without need to align or stack the light guiding layer to the light diffusion layer and place such assembly module in a heat sink frame.

Besides, in some embodiments, the corner may be processed to have a chamfer for preventing damage. Such chamfer may also help positioning, e.g. only one chamfer in a specific corner to fit in a slot of the heat sink frame. With such design, a light entrance side of the light guiding layer is ensured to face to the first LED light bar.

In some embodiments, the optical guiding module may further include a reflective layer on a back side of the optical guiding module. In such case, the reflective layer may be integrated with the light guiding layer and the light diffusion layer to form an assembly module. Please be noted that in some other embodiments, the surface of the light guiding layer is processed for soften light and the light diffusion layer may be reduced. Other features described in this specification may be integrated with such case or similar cases as another inventive solutions.

The reflective layer may be a white paper for reflecting light back to the front side, i.e. the desired light emitting side. Painting material may be used for replacing the white paper. In addition, the reflective layer may be selected with elastic material, so as to ensure a pressure to fix all elements when the back cover is pressing on the reflective layer.

In some embodiments, there may be an additional elastic layer between the back cover and a back side of the optical guiding module. For example, a formed plastic sheet may be used in such case. Other material may also be applied for different cost or other design factors, e.g. safety.

In some embodiments, there may be a driver box electrically connected to the first LED light bar via the heat sink frame. The driver box contains driver components for converting an external power source to a driving current to the first LED light bar. The driver box may have four lateral walls and a top cover. In some case, there is a bottom cover to be attached to the back cover of the panel light apparatus. In some other case, the bottom cover is not existed or has a cavity and the back cover of the panel light apparatus is used as the bottom cover for the driver box.

There may be an empty space, e.g. taking 10% to 40% of total containing space of the driver box for providing better safety. Wires and driver components are disposed in the driver box.

In some embodiments, the driver box is inserted to a receiver on the back cover and the receiver is positioned away from peripheral area of the back cover. In such design, users would not directly see the driver box particularly when the panel light apparatus is installed below a ceiling. Such design also helps keep the driver box away from the LED light bar, which generates certain heat, and thus increase life span of the overall panel light apparatus.

In some embodiments, the heat frame sink has an electrical terminal and a frame connector. The electrical terminal is fixed to a corresponding opposite electrical terminal for receiving an external power source. For example, there is a pre-installed wire in a ceiling for providing 110V or 220V electricity. There is an opposite electrical terminal associating to the electrical terminal disposed on the heat frame sink.

The electricity of the external power source is routed to the LED modules of the first LED light bar via the frame electrical connector. The frame electrical connector may be a pre-installed wire or a metal strip for guiding external electricity and/or control signal to the first LED light bar. If there is another LED light bar or more LED light bars as explained as follows, such frame electrical connectors help connect all these electrical components to form a close loop. Users only need to plug the LED light bar into the heat sink frame, and the heat sink frame provides both structure positioning and electricity providing functions.

In some embodiments, the frame electrical connector is a metal rigid bar fixed on the frame bar.

In some embodiments, the frame electrical terminal is a detachable socket structure. In such case, users may easily plug an external electricity wire with the opposite electrical terminal into the detachable socket structure. When users want to replace the panel light apparatus, users just need to unplug the external electricity wire away from the detachable socket structure. The socket may be provided on the external electricity wire and the frame electricity terminal may be a male pin to be connected to the associated socket.

In some embodiments, the frame electrical terminal is a one way plugging structure that is difficult to be detached by hands after connecting to the external power source. For example, a reverse hook may be disposed so that it is easy to install but difficult to un-install the panel light apparatus to satisfy certain safety requirements.

In some embodiments, there may be a second LED light bar disposed at an opposite side of the first LED light bar. An electrical connector of the frame bar that is intermediate to the first LED light bar and the second LED light bar provides electricity connection between the first LED light bar and the second LED light bar. For a rectangular panel light apparatus example, the four frame bars are named 'A', 'B', 'C', 'D' in sequence. The frame bars 'A' and 'C' are installed with LED light bars and the 'B' or 'D' which is intermediate frame bar between the two LED light bars may be installed with electrical connector for electrically connecting the two LED light bars. The two LED light bars may be electrically connected in series.

In some embodiments, there may be a control signal channel, an electrical loop for sending control signals. The control signal channel may be partly or all made of connectors pre-installed on the heat sink frame. No additional wires need to be prepared in such case to enhance manufacturing convenience.

In some embodiments, there are a first type of LED components and a second type of LED components in the first LED light bar, the first type of LED components and the second type of LED components have different color temperature characteristics. There may be a third type of LED components or more for providing a different light characteristic, e.g. different colors, to provide a mixed effect of the panel light apparatus.

In some embodiments, the frame bar has an installation groove for inserting and positioning the first LED light bar. The panel light apparatus may further include a fixing bar. The fixing bar and the frame bar together clip the first LED light bar in opposite directions.

In some embodiments, the fixing bar has an elastic component for pressing the first LED light bar from a lateral direction so that the first LED light bar keeps a predetermined distance from the light guiding layer. Such elastic component may be sprint or elastic clips or other components for providing such function mentioned above.

In some embodiments, the fixing bar is further fixed to the frame bar with an additional fastener, e.g. screws.

DETAILED DESCRIPTION

Figure 1:
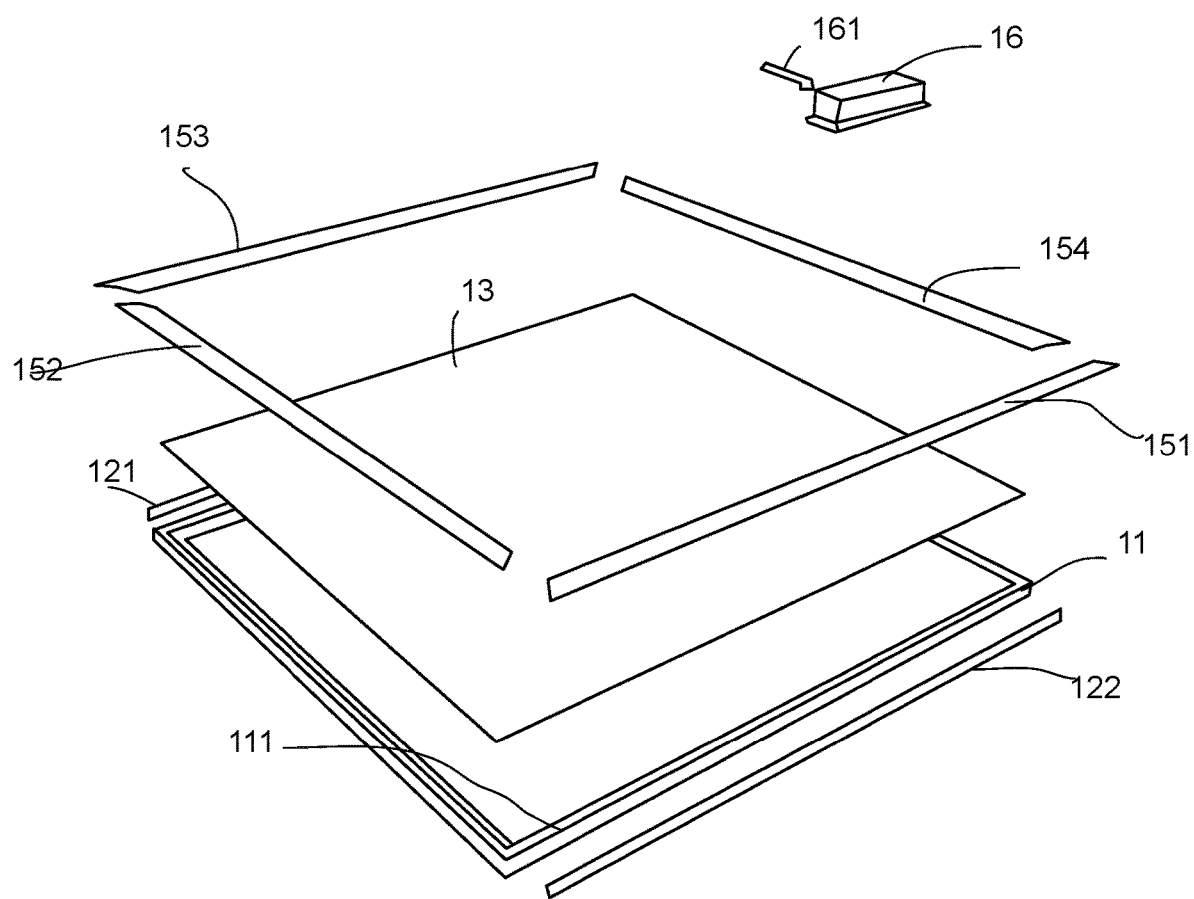
FIG. 1 illustrates major components of an embodiment of a panel light apparatus.

Please refer to FIG. 1. FIG. 1 illustrates major components of an embodiment of a panel light apparatus.

In FIG. 1, a LED light apparatus has a heat sink frame 11. The heat sink frame 11 has four frame bars like the one frame bar 111. In this example, there are two LED light bars 121, 122 to be installed to the heat sink frame 11. The heat sink frame 11 defines a surrounding border, the inner rectangular shape, for storing an optical guiding module 13.

Four fixing bars 151, 152, 153, 154 are used for pressing the optical guiding module 13 so that the optical guiding module 13 is clipped between the four fixing bars 151, 152, 153, 154 and the heat sink frame 11.

In this example, an external driver box 16 contains driver components for converting an external power source like a 110V or 220V electricity to a driving current for the two LED light bars 121, 122. The driver box 16 connects the two LED light bars 121, 122 via an opposite terminal 161, which connects to an electrical terminal that is further electrically connected to electrical connectors in the heat sink frame 11 for connecting to the two LED light bars 121, 122.

Figure 2A:
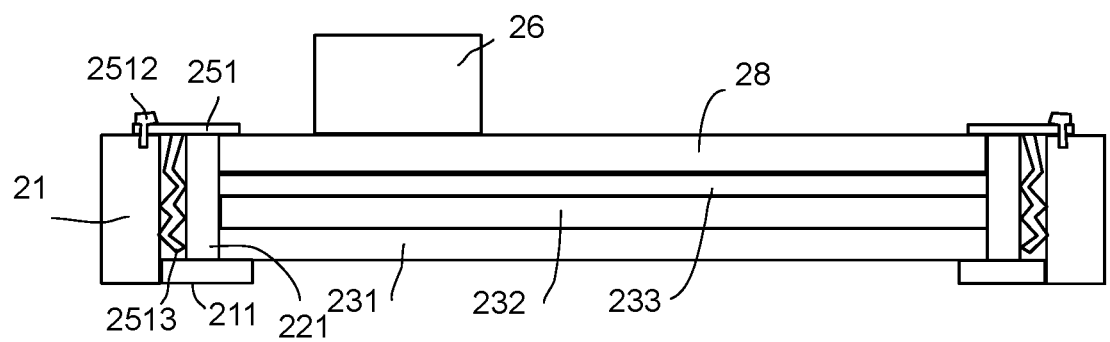
FIG. 2A is a side view illustrating spatial relation among components in an embodiment.
Figure 2B:
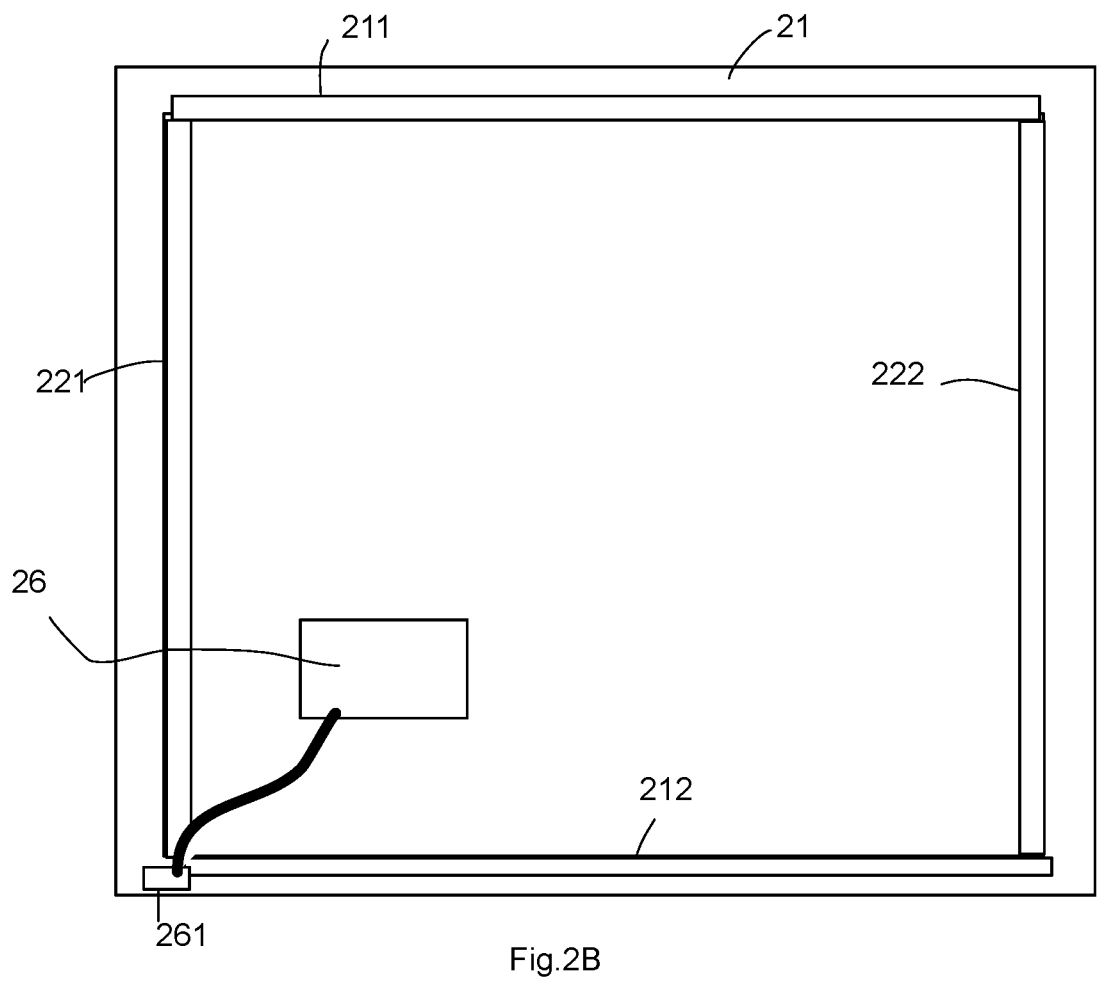
FIG. 2B is a top view illustrating spatial relation among components in an embodiment.

Next, please refer to FIG. 2A and FIG. 2B. FIG. 2A is a side view illustrating spatial relation among components in an embodiment. FIG. 2B is a top view illustrating spatial relation among components in an embodiment.

In FIG. 2A, a driver box is fixed to a back cover 28. The back cover 28 presses an optical guiding module. The optical guiding module has a reflective layer 233, a light guiding layer 232 and a light diffusion layer 231. In some other case, there may be an additional elastic layer between the back cover 28 and the reflective layer 233 for ensuring the layers of the light guiding module closely stick to each other.

In this example, a LED light bar 221 is clipped by a fixing bar 251 and a bottom part 211 of a frame bar 21 of a heat sink frame. In addition, there is an elastic component 2513. The elastic component 2513 is fixed to the fixing bar 251 for pressing the LED light bar 221 to align to a predetermined position with respect to a light guiding layer 232. The light emitted from LED modules of the LED light bar 221 enters the light guiding layer 232 and then moves to light diffusion layer 231 and then escapes from a front cover of the optical guiding module. Some light transmits upwardly and reflected by a reflective layer 233 back to the light guide layer 232.

The driver box 26 is fixed to the cover 28 and connects to the heat sink layer via an opposite electrical terminal, which is inserted to an electrical terminal 261 of the heat sink frame.

Figure 3:
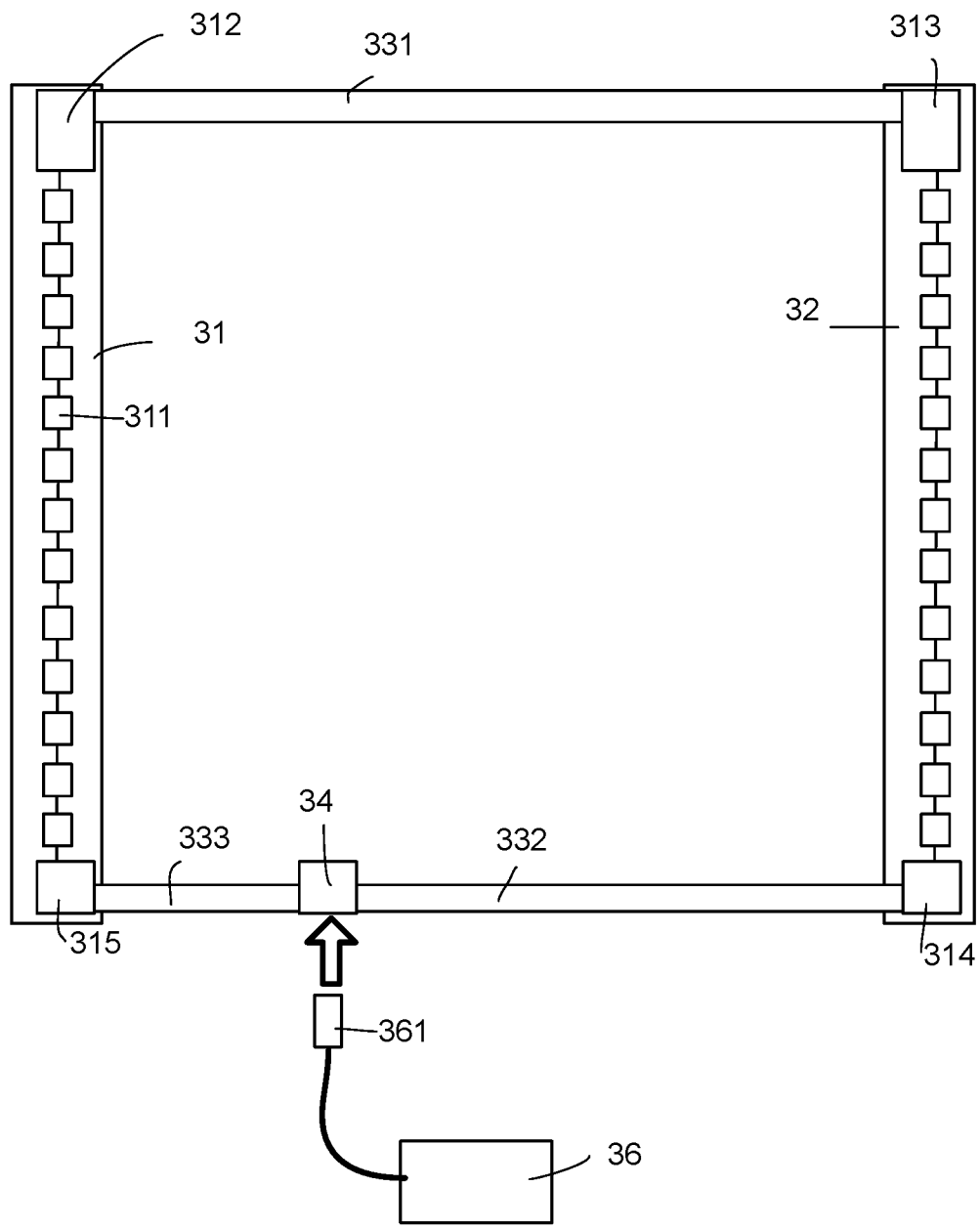
FIG. 3 illustrates LED electricity connection in an embodiment.

Please refer to FIG. 3. FIG. 3 illustrates LED electricity connection in an embodiment.

In FIG. 3, there are electrical connectors 331, 332, 333 disposed in the heat sink frame for helping transmitting electricity and even control signals for the two LED light bars 31, 32. In this example, the LED light bar 31 has multiple LED modules connected in series. The two LED light bars 31, 32 have first plugging structures 312, 313, 314, 315 to be plugged to second plugging structures of electrical connectors 331, 332, 333 in the heat sink frame.

An electricity terminal 34 is also disposed in the heat sink frame for receiving a driving current generated by a driver box 36. The driver box 36 is connected to the two LED light bars 31, 32 by plugging an opposite electrical terminal 361 to the electrical terminal 34.

Figure 4:
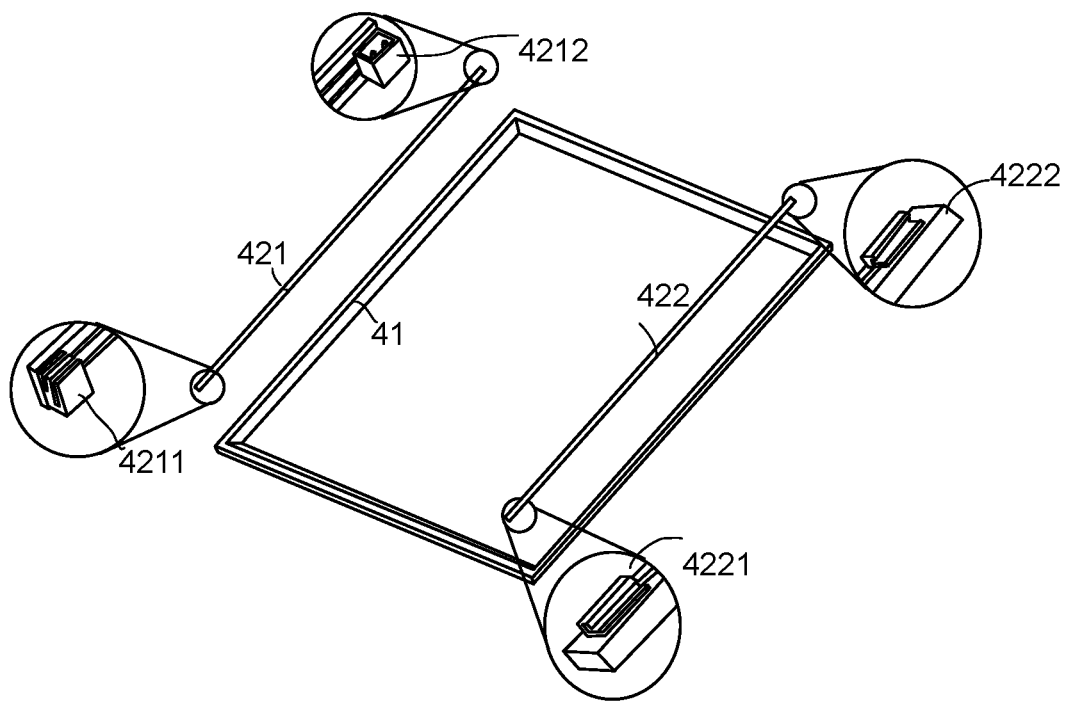
FIG. 4 illustrates electrical connector fixed on the heat sink frame embodiment.

Please refer to FIG. 4. FIG. 4 illustrates electrical connector fixed on the heat sink frame embodiment. Two electrical connectors 421, 422 fixed on a heat sink frame 41 are illustrated. At two ends of each electrical connectors 421, 422, there are two connectors 4211, 4212, 4221, 4222 that may be plugged. In this example, two LED light bars are plugged to the electrical connectors 421, 422 to be connected in series and to get a driving current.

Figure 5:
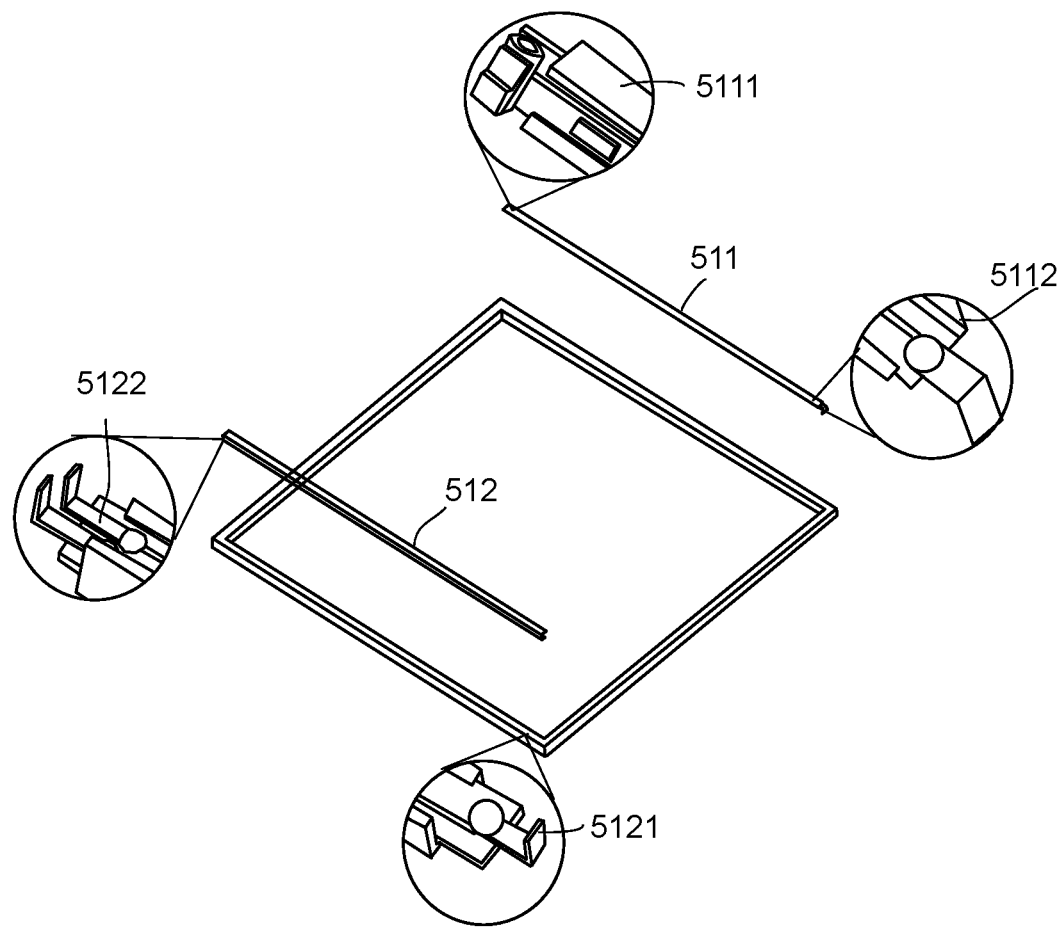
FIG. 5 illustrates examples for implementing plugging structures and related components in two LED light bars.

Please refer to FIG. 5. FIG. 5 illustrates examples for implementing plugging structures and related components in two LED light bars.

In FIG. 5, there are two LED light bars 511, 512. The two LED light bars 511, 512 have plugging structures 5121, 5122, 5111, 5112 at two ends to be connected to associated plugging structures as illustrated in FIG. 4. Other plugging structures may be used based on different design needs.

In a more general embodiment, a panel light apparatus includes a heat sink frame, a first LED light bar, an optical guiding module and a back cover. The panel light apparatus may be installed below a ceiling, attach to a wall or installed in other applications. The heat sink frame defines light output shape, e.g. a rectangular light output shape. The thickness of the panel light apparatus is usually smaller than width of the light output shape. Usually, the thickness of the panel light apparatus is smaller than normal downlight devices so that the panel light apparatus does not need an additional installation cavity, e.g. in a ceiling.

The heat sink frame includes a plurality of frame bars forming a surrounding border. For example, if the heat sink frame has a rectangular shape, there are four frame bars at four sides. The four frame bars form a rectangular surrounding border. Please be noted that the frame bar may also be made of one or multiple frame bars to form different shapes, e.g. circular, ellipse, two connected rectangular shapes like a digit '8' or other shapes.

The first LED light bar has a first plugging structure to be plugged to a second plugging structure on an inner side of one of the frame bars. For example, if the panel light apparatus is a rectangular shape panel light, there are four frame bars as mentioned above. One frame bar is disposed with a second plugging structure associating with a first plugging structure of a LED light bar. The first plugging structure may be a male pin when the second plugging structure may be a female socket, and vice versa. The first plugging structure and the second plugging structure may provide both structural connection and electricity connection. In other words, the first LED bar may receive electricity from the connection of the first plugging structure and the second plugging structure. Meanwhile, the first LED bar is fixed to the heat sink frame by the connection of the first plugging structure and the second plugging structure. Please be noted that the plugging structure may have various shapes, e.g. elastic clips, hooks and associates connecting structures.

Besides, the first LED light bar is a major heat source, and heat generated from the first LED light bar is transmitted to the frame bars of the heat sink frame.

The optical guiding module is placed in the surrounding border. For example, the surrounding border is a rectangular shape and the optical guiding module is also a similar rectangular shape but with a smaller size. The optical guiding module is placed in the enclosing border of the heat sink frame.

The optical guiding module may have a light diffusion layer and a light guiding layer. The light guiding layer may be a transparent plastic board a plurality of micro structures for guiding light received from a lateral side of the transparent plastic board to route in the light guiding layer and then escapes the light guiding layer from a plurality of micro optical structures, e.g. micro cavities, that may be formed on the transparent plastic board using laser beams or molding technologies.

The light guiding layer has a lateral side facing to LED modules of the first LED light bar for guiding light of the LED modules to the diffusion layer via the light guiding layer and then to escape from a front side of the optical guiding module.

The light diffusion layer is used for diffusing light so that the light would not look too hash for human eyes, e.g. to soften the output light and to avoid users see a series of strong light points.

In addition, the light guiding layer and the light diffusion layer are fixed together as an assembly module before being placed in the surrounding border. With such design, it is easy to assembly the final product by placing all components together. For example, when the light guiding layer and the light diffusion layer are fixed together as an assembly module, a manufacturer, even a distributor or a customer, may easily place these components together, instead of needing to positioning, aligning these components.

The back cover is fixed to the heat sink frame pressing a back side of the optical guiding module. The term 'pressing' refers to directly or indirectly providing a force on the back side of the optical guiding module. The back side is opposite to a front side where light is output.

In some embodiments, the frame bars are mainly elongated metal bars. Some additional components like plastic, rubber components may also be added.

In some embodiments, the external surface of the heat sink frame has horizontal ripple structures. Such horizontal ripple structures increase rigidity of the panel light apparatus. Such horizontal ripple structures also enhance heat dissipation effect.

Specifically, the horizontal ripple structures may be composed of a series of concave and convex structures on the external surface of frame bars. In the example of a rectangular panel light apparatus, there are four frame bars defining a surrounding border that has a front side for light to emit and a back side to connect to a driver. In such example, the external surfaces are the four lateral surfaces of the four frame bars facing outwardly and substantially perpendicular to the front side and the back side. The term horizontal in the horizontal ripple structures refers that convex and concave structures are substantially perpendicular to the front side and the back side.

There is another type of example. The external surface of the frame bars is disposed with vertical ripple structures. In such embodiments, the convex and concave structures on the surfaces of the frame bars are parallel to the front side and the back side.

In some embodiments, the optical guiding module has a clip at a corner for fixing the light guiding layer to the light diffusion layer. The clips may be made of a plastic element or any other elastic elements for pressing the light guiding layer and the light diffusion layer as an assembly module. The clip may also be a tape using glues to attach on surface of the light guiding layer and the light diffusion layer. In addition to the corner, there may be more than one clips for ensuring the light guiding layer fixed to the light diffusion layer as an assembly module. In other words, manufacturers or users may take one such assembly module without need to align or stack the light guiding layer to the light diffusion layer and place such assembly module in a heat sink frame.

Besides, in some embodiments, the corner may be processed to have a chamfer for preventing damage. Such chamfer may also help positioning, e.g. only one chamfer in a specific corner to fit in a slot of the heat sink frame. With such design, a light entrance side of the light guiding layer is ensured to face to the first LED light bar.

Figure 7:
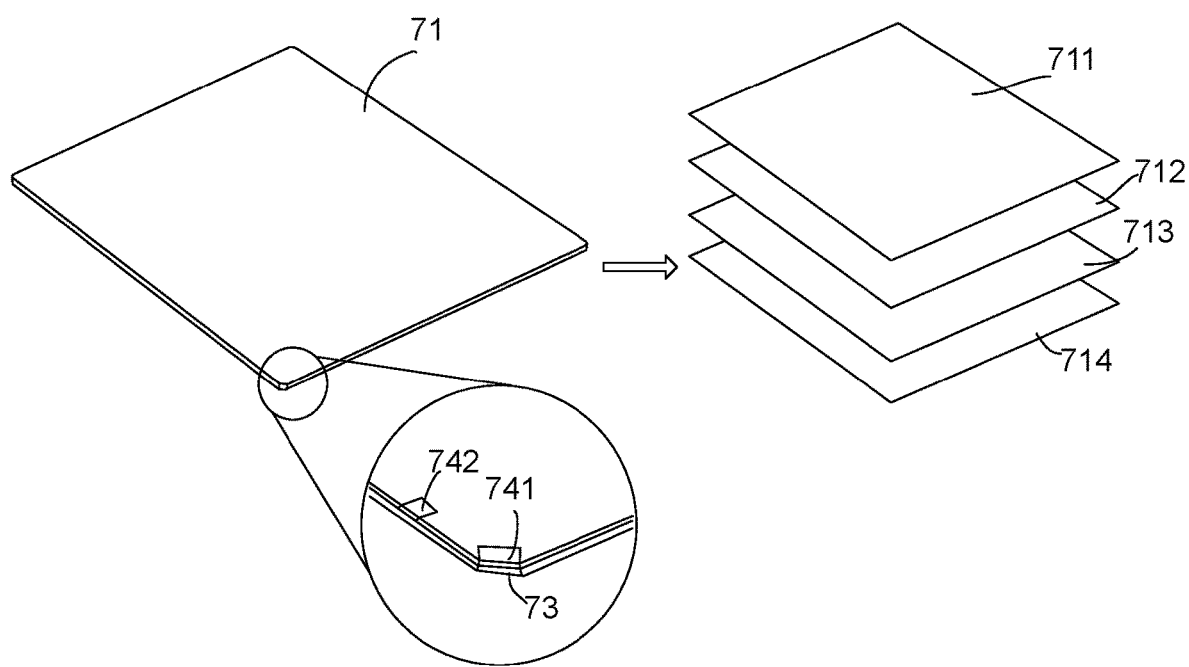
FIG. 7 illustrates a structure of an optical guiding module.

Please refer to FIG. 7. FIG. 7 illustrates a structure of an optical guiding module.

In FIG. 7, an optical guiding module 71 is processed to have a chamfer 73 at its corner. There are two clips 741, 742 for fixing an elastic layer 711, a reflective layer 712, a light guiding layer 713 and a light diffusion layer 714 together as an assembly module.

In some embodiments, the optical guiding module may further include a reflective layer on a back side of the optical guiding module. In such case, the reflective layer may be integrated with the light guiding layer and the light diffusion layer to form an assembly module. Please be noted that in some other embodiments, the surface of the light guiding layer is processed for soften light and the light diffusion layer may be reduced. Other features described in this specification may be integrated with such case or similar cases as another inventive solutions.

The reflective layer may be a white paper for reflecting light back to the front side, i.e. the desired light emitting side. Painting material may be used for replacing the white paper.

In addition, the reflective layer may be selected with elastic material, so as to ensure a pressure to fix all elements when the back cover is pressing on the reflective layer.

In some embodiments, there may be an additional elastic layer between the back cover and a back side of the optical guiding module. For example, a formed plastic sheet may be used in such case. Other material may also be applied for different cost or other design factors, e.g. safety.

In some embodiments, there may be a driver box electrically connected to the first LED light bar via the heat sink frame. The driver box contains driver components for converting an external power source to a driving current to the first LED light bar. The driver box may have four lateral walls and a top cover. In some case, there is a bottom cover to be attached to the back cover of the panel light apparatus. In some other case, the bottom cover is not existed or has a cavity and the back cover of the panel light apparatus is used as the bottom cover for the driver box.

There may be an empty space, e.g. taking 10% to 40% of total containing space of the driver box for providing better safety. Wires and driver components are disposed in the driver box.

In some embodiments, the driver box is inserted to a receiver on the back cover and the receiver is positioned away from peripheral area of the back cover. In such design, users would not directly see the driver box particularly when the panel light apparatus is installed below a ceiling. Such design also helps keep the driver box away from the LED light bar, which generates certain heat, and thus increase life span of the overall panel light apparatus.

In some embodiments, the heat frame sink has an electrical terminal and a frame connector. The electrical terminal is fixed to a corresponding opposite electrical terminal for receiving an external power source. For example, there is a pre-installed wire in a ceiling for providing 110V or 220V electricity. There is an opposite electrical terminal associating to the electrical terminal disposed on the heat frame sink.

The electricity of the external power source is routed to the LED modules of the first LED light bar via the frame electrical connector. The frame electrical connector may be a pre-installed wire or a metal strip for guiding external electricity and/or control signal to the first LED light bar. If there is another LED light bar or more LED light bars as explained as follows, such frame electrical connectors help connect all these electrical components to form a close loop. Users only need to plug the LED light bar into the heat sink frame, and the heat sink frame provides both structure positioning and electricity providing functions.

In some embodiments, the frame electrical connector is a metal rigid bar fixed on the frame bar.

In some embodiments, the frame electrical terminal is a detachable socket structure. In such case, users may easily plug an external electricity wire with the opposite electrical terminal into the detachable socket structure. When users want to replace the panel light apparatus, users just need to unplug the external electricity wire away from the detachable socket structure. The socket may be provided on the external electricity wire and the frame electricity terminal may be a male pin to be connected to the associated socket.

In some embodiments, the frame electrical terminal is a one way plugging structure that is difficult to be detached by hands after connecting to the external power source. For example, a reverse hook may be disposed so that it is easy to install but difficult to un-install the panel light apparatus to satisfy certain safety requirements.

In some embodiments, there may be a second LED light bar disposed at an opposite side of the first LED light bar. An electrical connector of the frame bar that is intermediate to the first LED light bar and the second LED light bar provides electricity connection between the first LED light bar and the second LED light bar. For a rectangular panel light apparatus example, the four frame bars are named 'A', 'B', 'C', 'D' in sequence. The frame bars 'A' and 'C' are installed with LED light bars and the 'B' or 'D' which is intermediate frame bar between the two LED light bars may be installed with electrical connector for electrically connecting the two LED light bars. The two LED light bars may be electrically connected in series.

In some embodiments, there may be a control signal channel, an electrical loop for sending control signals. The control signal channel may be partly or all made of connectors pre-installed on the heat sink frame. No additional wires need to be prepared in such case to enhance manufacturing convenience.

In some embodiments, there are a first type of LED components and a second type of LED components in the first LED light bar, the first type of LED components and the second type of LED components have different color temperature characteristics. There may be a third type of LED components or more for providing a different light characteristic, e.g. different colors, to provide a mixed effect of the panel light apparatus.

In some embodiments, the frame bar has an installation groove for inserting and positioning the first LED light bar. The panel light apparatus may further include a fixing bar. The fixing bar and the frame bar together clip the first LED light bar in opposite directions.

In some embodiments, the fixing bar has an elastic component for pressing the first LED light bar from a lateral direction so that the first LED light bar keeps a predetermined distance from the light guiding layer. Such elastic component may be sprint or elastic clips or other components for providing such function mentioned above.

Figure 6A:
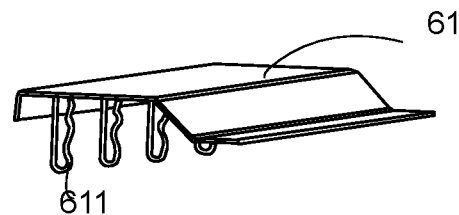
FIG. 6A illustrates a fixing bar.
Figure 6B:
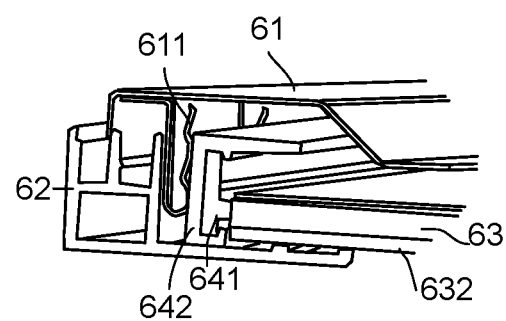
FIG. 6B illustrates how the fixing bar works with a frame bar to fix a LED light bar to face to a light guiding layer.

Please refer to FIG. 6A and FIG. 6B. FIG. 6A illustrates a fixing bar. FIG. 6B illustrates how the fixing bar works with a frame bar to fix a LED light bar to face to a light guiding layer.

In FIG. 6A and FIG. 6B, a fixing bar 61 is an elongated sheet. There is an elastic component 611 installed on the fixing bar 61. In this example, the elastic component 611 is an elastic curved metal wire.

In FIG. 6B, when the fixing bar 61 is installed, the fixing bar 61 and the frame bar 61 of the heat sink frame together fix a LED light bar 642. Furthermore, the elastic component 611 presses the LED light bar 642 from a lateral side to ensure the LED components 641 on the LED light bar 642 to keep a desired distance to the light guiding layer 63 of an optical guiding module. The optical guiding module may further include a light diffusion layer 632.

In some embodiments, the fixing bar is further fixed to the frame bar with an additional fastener, e.g. screws.

In addition to the above-described embodiments, various modifications may be made, and as long as it is within the spirit of the same invention, the various designs that can be made by those skilled in the art are belong to the scope of the present invention.

The invention claimed is:

1. A panel light apparatus, comprising:
    a heat sink frame, comprising a plurality of frame bars forming a surrounding border;
    a first LED light bar with a first plugging structure to be plugged to a second plugging structure on an inner side of one of the frame bars for fixing the first LED light bar to the heat sink frame, heat of the LED light bar being transmitted to the heat sink frame;
    an optical guiding module to be placed in the surrounding border, the optical guiding module comprising a light diffusion layer and a light guiding layer, a lateral side of the light guiding layer facing to LED modules of the first LED light bar for guiding light of the LED modules to the diffusion layer via the light guiding layer and then to escape from a front side of the optical guiding module, the light guiding layer and the light diffusion layer being fixed together as an assembly module before being placed in the surrounding border;
    a second LED light bar disposed at an opposite side of the first LED light bar, wherein an electrical connector of the frame bar intermediate to the first LED light bar and the second LED light bar provides electricity connection between the first LED light bar and the second LED light bar, the second plugging structure is attached to one end of the electrical connector for connecting to the first plugging structure of the first LED light bar for electrically connecting the first LED light bar and the second LED light bar; and a back cover fixed to the heat sink frame pressing a back side of the optical guiding module, wherein an external surface of the heat sink frame has horizontal ripple structures, wherein the frame bar has an installation groove for inserting and positioning the first LED light bar, the panel light apparatus further comprises a fixing bar, the fixing bar and the frame bar together clip the first LED light bar in opposite directions, wherein the fixing bar has an elastic component for pressing the first LED light bar from a lateral direction so that the first LED light bar keeps a predetermined distance from the light guiding layer.

2. The panel light apparatus of claim 1, wherein the frame bars comprise elongated metal bars.

3. The panel light apparatus of claim 1, wherein an external surface of the heat sink frame has vertical ripple structures.

4. The panel light apparatus of claim 1, wherein the optical guiding module has a clip at a corner for fixing the light guiding layer to the light diffusion layer.

5. The panel light apparatus of claim 4, wherein the corner has a chamfer.

6. The panel light apparatus of claim 1, wherein the optical guiding module further comprises a reflective layer on a back side of the optical guiding module.

7. The panel light apparatus of claim 1, further comprising an elastic layer between the back cover and a back side of the optical guiding module.

8. The panel light apparatus of claim 1, further comprising a driver box electrically connected to the first LED light bar via the heat sink frame, the driver box containing driver components for converting an external power source to a driving current to the first LED light bar.

9. The panel light apparatus of claim 1, wherein there are a first type of LED components and a second type of LED components in the first LED light bar, the first type of LED components and the second type of LED components have different color temperature characteristics.

10. The panel light apparatus of claim 1, wherein the fixing bar is further fixed to the frame bar with an additional fastener.

* * * * *